United States Patent [19]

Takenouchi et al.

[11] 3,877,070

[45] Apr. 8, 1975

[54] 2-CHANNEL - 4-CHANNEL CHANGEOVER DEVICE IN A CARTRIDGE-TYPE TAPE RECORDER

[75] Inventors: Kazuo Takenouchi, Yokohama; Hiroshi Kinoshita, Kawasaki, both of Japan

[73] Assignee: Victor Company of Japan, Ltd., Yokohama City, Japan

[22] Filed: Mar. 6, 1973

[21] Appl. No.: 338,569

[30] Foreign Application Priority Data

Mar. 8, 1972 Japan ............................... 47-28408

[52] U.S. Cl. ...................................... 360/78; 360/63

[51] Int. Cl. ........................................... G11b 21/08

[58] Field of Search .................... 360/63, 69, 75, 78

[56] References Cited

UNITED STATES PATENTS 3,730,532 5/1973 Miyamoto ............................ 360/63

*Primary Examiner*—Stanley M. Urynowicz, Jr.
*Assistant Examiner*—Alan Faber
*Attorney, Agent, or Firm*—Holman & Stern

[57] ABSTRACT

In a cartridge-type tape recorder for reproducing and recording with 2-channel cartridges and 4-channel cartridges, there is provided a 2-channel - 4-channel changeover device comprising a plunger for changing the height position of a magnetic head, a first switch for opening and closing a driving circuit for the plunger, a second switch for changeover switching circuit connections between 2-channel and 4-channel states, a third switch for connecting and disconnecting a power-supply circuit, and a mechanism for changing over of the operations of said first, second, and third switches in response to the insertion of a cartridge into loaded position. The switch operation changeover mechanism operates at the time of insertion of a 2-channel cartridge into loaded position to open the first switch, to changeover the second switch to the 2-channel side, and to close the third switch and operates at the time of extraction of cartridge of the open the third switch, to changeover the second switch to the 4-channel side, and to close the first switch.

6 Claims, 5 Drawing Figures

2-CHANNEL - 4-CHANNEL CHANGEOVER DEVICE IN A CARTRIDGE-TYPE TAPE RECORDER

BACKGROUND OF THE INVENTION

This invention relates to a device for changeover switching between 2-channel and 4-channel operation of cartridge-type tape recorders. More particularly, the invention relates to a device for automatically changeover switching between 2-channel and 4-channel operation components such as the mechanism for changing over the height of the heads in accordance with the cartridge used and the sound recording and reproducing circuits in a tape recorder adapted to use both 2-channel cartridges and 4-channel cartridges.

In general, in an 8-track type tape cartridge, 8 tracks are formed on a magnetic tape. In the case where this 8-track cartridge is used as a 2-channel system, one pair of 2-channel signal tracks is selected respectively in the first and fifth tracks, the second and sixth tracks, the third and seventh tracks, and the fourth and eighth tracks, and recording or reproducing of a total of four (first through fourth) program signals is carried out. In the case where this 8-track cartridge is used as a 4-channel system, one set of four channel signal tracks is selected respectively in the first, third, fifth, and seventh tracks and in the second, fourth, sixth, and eighth tracks, and recording or reproducing of a total of two (first and second) program signals is carried out.

Accordingly, in a tape recorder which carries out recording and reproducing with the use of both 2-channel cartridges and 4-channel cartridges, means are necessary for accomplishing the following changeover switching. When a 2-channel cartridge is used, it is necessary to switch the height positions of one pair of two heads in 4 steps in correspondence to respective program signal tracks. On the other hand, when a 4-channel cartridge is used, it is necessary to switch the height positions of a group of four heads in 2 steps in correspondence to respective program signal tracks. Furthermore, it is necessary to switch the recording and reproducing circuits also between 2-channel operation and 4-channel operation in accordance with the cartridge to be used.

Then, in order to carry out these switching operations automatically, it has been the conventional practice to provide a slot at a specific position on each 4-channel cartridge and not to provide a slot on the 2-channel cartridge. Then, at the time of operation, the presence or absence of the slot of the cartridge inserted into the tape recorder is detected, and selective switching between 2-channel operation and 4-channel operation is carried out automatically in accordance with the result of the detection.

In this case, the tape recorder is normally in a state corresponding to a 4-channel cartridge, and, when a 2-channel cartridge is inserted thereby to load the tape recorder, this condition is detected to carry out switching of the head changeover mechanism and circuit, etc., to conform to the 2-channel cartridge.

When a 2-channel cartridge is thus inserted into the tape recorder, this action closes a power-supply switch to place the various circuits and mechanisms of the tape recorder in operative state, but heretofore, there have been frequent instances wherein the changeover switching operations from the 4-channel system to the 2-channel system are not accomplished fully and simultaneously. In such a case, when an attempt is made to reproduce a third (or fourth) program signal of the 2-channel cartridge, there occurs a troublesome phenomenon whereby the heads do not stop at height positions corresponding to the tracks of the third and fourth programs but shift to the height position corresponding to the tracks of the first program.

Furthermore, when a 2-channel cartridge is extracted out of the tape recorder, the power-supply switch is opened, but the plunger is caused to operate by a voltage due to a charge remaining in a capacitor in the circuits, whereby the head heights are switched unnecessarily, similarly as in the above described case.

SUMMARY OF THE INVENTION

Accordingly, it is a general object of the present invention to provide a novel and useful device for changeover switching between 2-channel and 4-channel systems in a cartridge-type tape recorder in which the above described difficulties accompanying known devices are overcome.

More specifically, an object of the invention is to provide a device which is capable of carrying out accurate and positive switching between 2-channel and 4-channel states of a head height changeover mechanism, circuits, etc., in accordance with the type of cartridge, 2-channel or 4-channel, used in a cartridge-type tape recorder.

Another object of the invention is to provide a 2-channel - 4-channel changeover switching device adapted to first open a switch for a program jumping circuit and to then close the power-supply switch. By the use of this device, misoperation wherein, when a 2-channel cartridge is inserted into the tape recorder or when it is extracted, the program jumping circuit and mechanisms operate to carry out unnecessary head height switching is prevented.

Still another object of the invention is to provide a 2-channel - 4-channel changeover switching device wherein, at the time when a cartridge is inserted into loaded state in the tape recorder, the opening of the switch for the program jumping-circuit is carried out prior to the closing of the power-supply switch, and, at the time when the cartridge is extracted, the closing of the switch for the program jumping circuit is carried out after the opening of the power-supply switch.

Further objects and features of the present invention will be apparent from the following detailed description with respect to a preferred embodiment of the invention when read in conjunction with the accompanying drawings, throughout which like parts are designated by like reference numerals.

DETAILED DESCRIPTION

Figure 1:
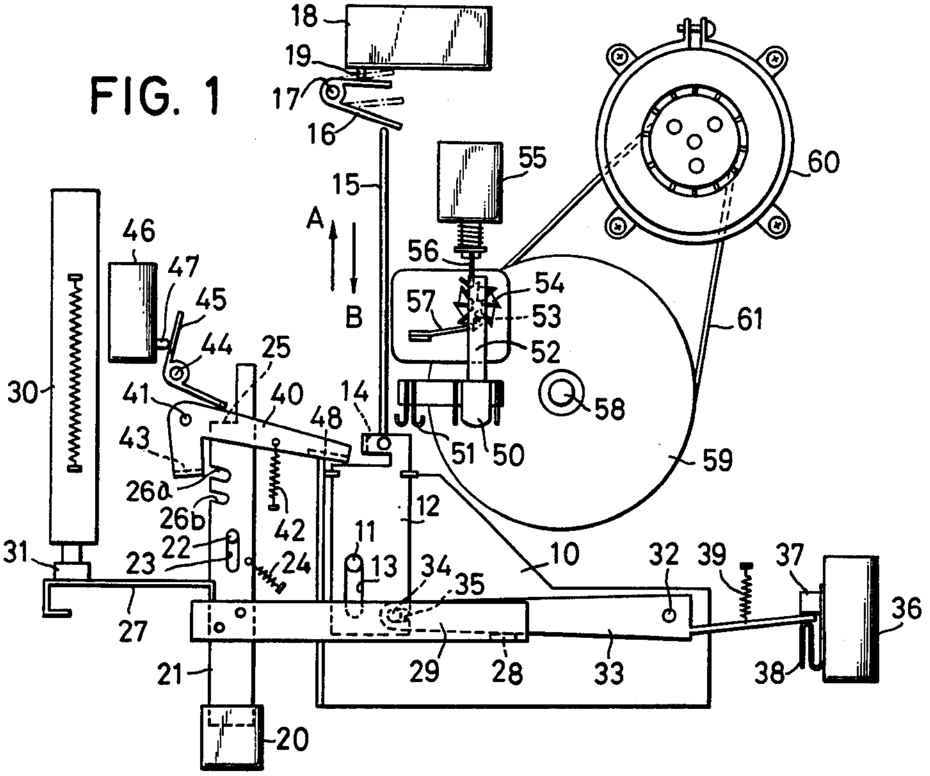
FIG. 1 is a plan view showing the essential parts of one embodiment of a 2-channel - 4-channel switching device according to the invention, shown in a non-operative state.

Referring first to FIG. 1 illustrating one embodiment of a changeover switching device of the invention in inoperative state, there is provided a cartridge-loading guide plate 10, on which is embeddedly fixed a stud guide pin 11. This guide pin 11 is slidably fitted in a slot 13 formed in a slide plate 12, which, thus guided, is slidably movable in the arrow directions A and B. This slide plate 12 is provided at one edge thereof with a downwardly bent part constituting a detecting part 14. The slide plate 12 is further provided at its end with a rod 15 for sliding unitarily therewith.

The extreme outer end of this rod 15 is abutting against one arm of an elastic button-pushing member 16 pivoted on a pivot pin 17 and rotated in the counterclockwise direction when the rod 15 moves in the direction A thereby to push the button 19 of a normally-closed switch 18, which is thereby opened.

The button-pushing member 16 is provided with a resistance member such as silicone grease, having viscosity and interposed between the member 16 and the pivot pin 17.

A slide lever 21 having a recording button 20 at one end thereof is provided with a slot 23 slidably engaged with a stud pin 22 embeddedly fixed to the chassis of the tape recorder and is thereby free to slide in the arrow directions A and B. This slide lever 21 is continually urged to slide in the arrow direction B by a tension spring 24. This slide lever 21 is provided with a ledge or shoulder 25 at its other end and with cutouts 26*a* and 26*b* for locking formed in one longitudinal edge part thereof. In addition, a pushing member 27 of plate form and of elastic character and an arm 29 having at its outer end a downwardly bent pushing part 28 are fixed to the upper surface of the slide lever 21. The pushing member 27 is adapted to push a button 31 of a recording switch 30 when the slide lever 21 slides in the arrow direction A.

A lever 33 is pivoted at one end thereof by a 32 on the upper surface of the guide plate 10. A pin 34 embeddedly fixed to the other distal end of this lever 33 is fitted in a slot 35 formed in the slide plate 12. The pivoted proximal end of the lever 33 has an integrally formed extension interposed between a slide switch button 37 of a channel changeover switch 36 and a leaf spring 38 fixed to the button 37. The lever 33 is continually urged to rotate in the counterclockwise direction by a spring 39 but, normally, it is stopped and held in the state indicated in FIG. 1 by the pushing part 28 of the arm 29 contacting one edge of the lever 33. In FIG. 1, the switch 36 is shown in its switched state for 4-channel operation.

A bellcrank lever 40 is pivoted at its bent part by a pivot pin 41 and is continually urged to turn in the clockwise direction by a spring 42. This lever 40 is provided at the end of one arm thereof with a bent flange part 48 to be pushed by a cartridge as described hereinafter and at the end of the other arm thereof with a bent flange part 43 for engaging with the aforementioned cutouts 26*a* and 26*b* in the slide lever 21 thereby to lock this slide lever.

A switch-pushing member 45 pivoted by a pivot pin 44 is so disposed that it is rotated in the counterclockwise direction by the counterclockwise rotation of the lever 40 or by the sliding movement of the sliding movement of the slide lever 21 in the arrow direction A thereby to push the button 47 of a power-supply switch 46.

A recording-reproducing head 50 and a sensor 51 are provide in positions such that, when a cartridge is inserted into a loaded position in the tape recorder as described hereinafter, they enter relatively into openings formed in the inner end of the cartridge and abut against the magnetic tape within the cartridge. The head 50 is supported on one end of an arm 52 provided on its lower surface with an embeddedly fixed pin 53, which is pressed in contact with the upper surface of a cam 54 having eight stepped parts. These stepped parts are in two groups, each group consisting of four stepped parts of respectively different heights. The peripheral part of this cam 54 is in the form of a ratchet, and the cam 54 is driven in rotation by the outer tip of a plunger rod 56 of a plunger 55. Each reciprocating action of the plunger rod 56 thus drives the cam 54 through a rotational angle corresponding to one of its steps. Reverse rotation of this cam 54 is prevented by a stop detent 57.

A capstan 58 is provided with a flywheel 59 secured integrally and coaxially thereto and is driven by power generated by a motor 60 and transmitted to the capstan by way of an endless belt 61 stretched around a pulley on the motor shaft and the flywheel.

Figure 5:
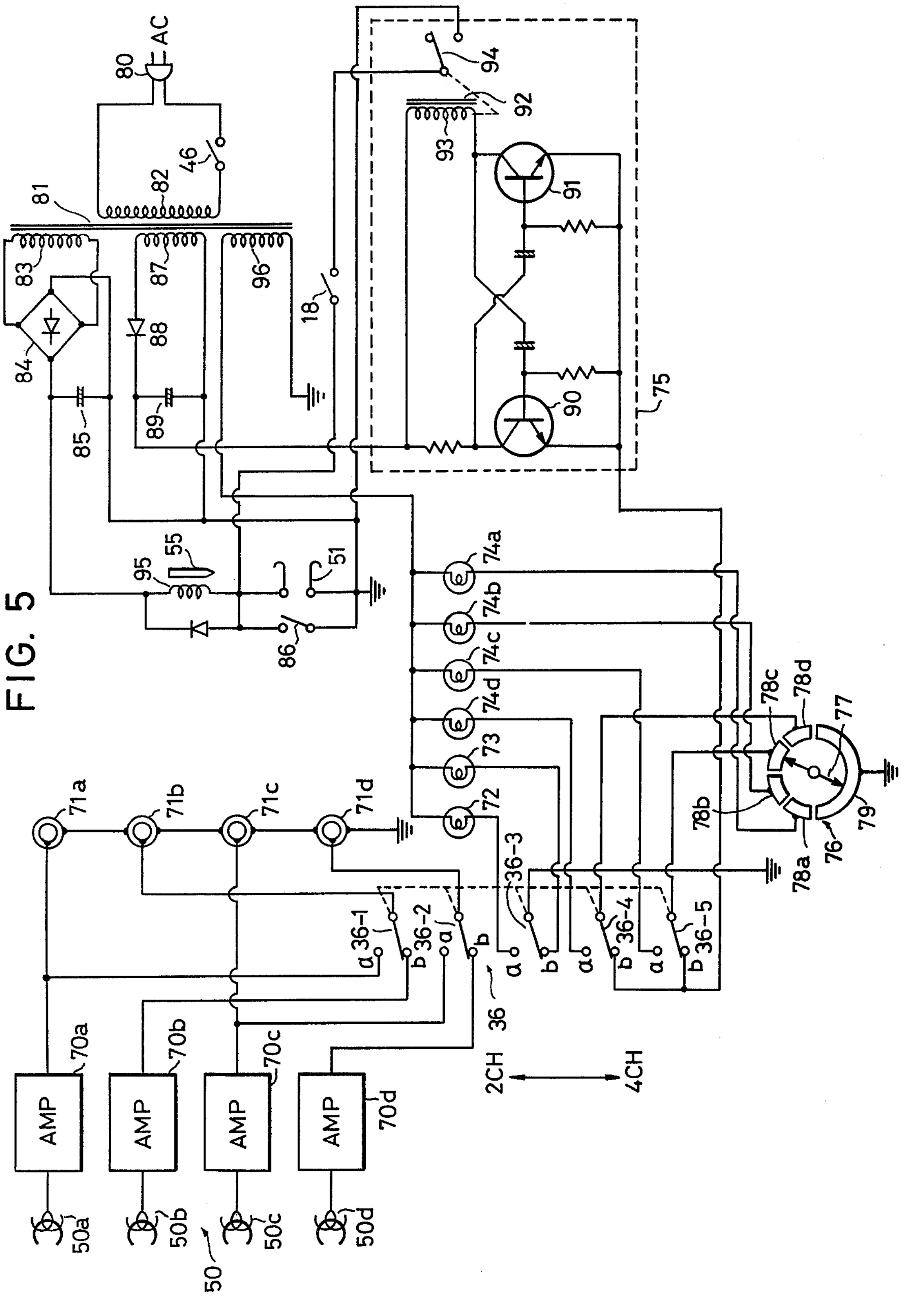
FIG. 5 is a schematic diagram showing the essential parts and organization of the electric circuit of a tape recorder in which the changeover switching device of the invention can be applied.

Next, one embodiment of an electrical circuit constituting an essential part of a tape recorder to which a changeover switching device of the invention is applied will now be described with reference to FIG. 5.

The magnetic head 50 has four head elements 50*a*, 50*b*, 50*c*, and 50*d* respectively for the first through fourth channels, and these head elements are respectively connected to four amplifiers 70*a*, 70*b*, 70*c*, and 70*d* respectively for the first through fourth channels. The amplifier 70*a* is connected to a terminal 71*a* for the first channel and to a contact point *a* of a switch 36-1 of the aforementioned channel-changeover switch 36. The amplifier 70*b* is connected to another contact point *b* of the switch 36-1. The movable contact of the switch 36-1 is connected to a terminal 71*b* for the second channel. The amplifier 70*c* is connected to a terminal 71*c* for the third channel and to a contact point *a* of a switch 36-2 of the switch 36. The amplifier 70*d* is connected to another contact point *b* of the switch 36-2. The moving contact of the switch 36-2 is connected to a terminal 71*d* for the fourth channel.

Another switch 36-3 of the channel-changeover switch 36 has two contact points *a* and *b* respectively connected to a 2-channel indicating lamp 72 and a 4-channel indicating lamp 73 and a movable contact connected to ground (earth). Another switch 36-4 of the switch 36 has a contact point *a* connected to a fourth program indicating lamp 74*d*. Still another switch 36-5 of the switch 36 has a contact point *a* connected to a third program indicating lamp 74*c*. Contact points *b*, *b* of the switches 36-4 and 36-5 are connected commonly to a flip-flop circuit 75.

The rotatable contact 77 of a rotary switch 76 is fixed to the bottom surface of the aforementioned cam 54 and rotates unitarily therewith. The rotatable contact 77 thereby rotates intermittently together with the intermittent rotation of the cam 54 and successively contacts the stationary contact points 78a through 78d, at the same continually contacting a ground contact 79. The contact points 78a and 78b are respectively connected to first and second program indicating lamps 74a and 74d, while the contact points 78c and 78d are respectively connected to the movable contacts of the switches 36-5 and 36-4. The above mentioned switches 36-1 through 36-5 are ganged for intercoupled operation, their contact points *a* being for the 2-channel side and their contact points *b* being for the 4-channel side. Accordingly, when the button 37 of the channel-changeover switch 36 is in the state indicated in FIG. 1, the movable contacts of the switches 36-1 through 36-5 are in contact with their respective contact points *b*, that is, the 4-channel side.

The aforementioned power-supply switch 46 is connected between one terminal of a plug 80 for plugging into an AC power outlet and one terminal of the primary winding 82 of a transformer 81. This transformer 81 has three secondary windings, of which a first winding 83 is connected to a rectifying circuit 84 comprising a bridge connection of a diode, to a smoothing capacitor 85, and further to the solenoid coil 95 of the aforementioned plunger 55 and sensor 51. A program-selector switch 86, which can be manually closed, is connected in parallel with the sensor 51. A second secondary winding 87 of the transformer 81 is connected to a diode 88 for rectification, to a smoothing capacitor 89, and further to the aforementioned flip-flop circuit 75.

The flip-flop circuit 75 is of a known circuit organization containing transistors 90 and 91, and its output side is connected to a coil 93 of a relay 92. This relay 92 has a normally-opened relay switch 94, which is closed when a current is passed through the relay coil 93. The aforementioned switch 18 is connected between the movable contact of the relay switch 94 and the solenoid coil 95 of the plunger 55.

The terminals of the indicating lamps 72, 73, and 74a through 74d are connected commonly to one terminal of the third secondary winding 96 of the transformer 81.

The changeover switching device of the above described organization according to the invention is operated in the following manner.

Figure 2:
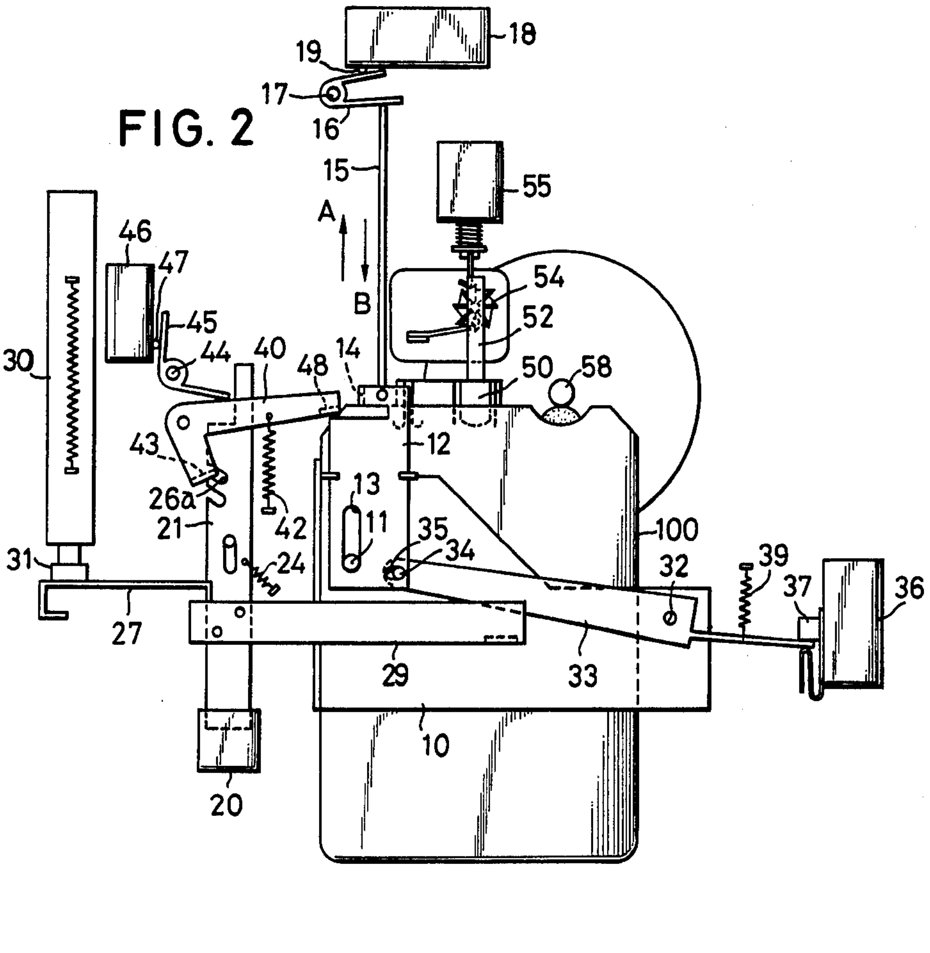
FIG. 2 is a similar plan view showing the same device in the operational state of reproducing a tape recording in a 2-channel cartridge.

First, the case of reproducing of the 2-channel cartridge will be considered. As indicated in FIG. 2, a 2-channel cartridge 100 is inserted along the guide plate 10 in the arrow direction A into the predetermined loaded position. As the cartridge 100 is thus inserted in the arrow direction A, the inner end of this cartridge engages the detecting part 14 of the slide plate 12 and pushes the sliding plate 12 in sliding movement in the direction A. Consequently, the rod 15 also moves in the arrow direction A, and its end, acting through the botton-pushing member 16, pushes the button 19 and thereby opens the switch 18.

On one hand, the sliding movement of the slide plate 12 in the direction A causes the lever 33 to rotate in the clockwise direction against the force of the spring 39. Consequently, the button 37 of the channel-changeover switch 36 is moved in the direction B, whereby the moving contacts of all switches 36-1 through 36-5 are switched into contact with their respective contact points *a*.

The above described insertion of the cartridge 100 also causes the inner end of the cartridge to push the bent part 48 of the lever 40, which is thereby rotated in the counterclockwise direction counter to the force of the spring 42. As a result of this rotation of the lever 40, the button 47 of the power-supply switch 46 is pushed through the member 45 thereby to close the switch 46. At the same time, the bent part 43 of the lever 40 engages with the cutout 26a, thereby locking the slide bar 21 and preventing its sliding movement due to any pushing thereof by mistake during the reproducing operation of the cartridge.

The dimensions and shapes of the various pertinent parts are so selected that the sequence of changeover switching and opening and closing of the above described switches 18, 36, and 46 will be in the order of (1) the opening of the switch 18, (2) the changeover of the switch 36 to the 2-channel side, i.e., the switching of the movable contacts of the switches 36-1 through 36-5 into contact with their respective contact points *a*, and (3) the closing of the power-supply switch 46.

If the above mentioned switching operations are caused to take place substantially simultaneously, there will arise instances wherein the power-supply switch 46 closes prior to the opening of the switch 18 and the changeover switching of the switch 36. In such a case, when the magnetic head 50 is in its position confronting the third or fourth program on the tape, that is, when the rotatable contact 77 of the rotary switch 76 is in contact with the contact point 78c and 78d, the flip-flop circuit 75 operates, whereby the relay 92 operates, and the plunger 55 operates to rotate the cam 54, thereby carrying out adjustment of the head height so that the head reaches the position corresponding to the first program. As a consequence, there arises a disadvantageous phenomenon whereby the desired reproduction of the third or fourth program cannot be accomplished.

According to the present invention, however, since the opening and closing of the switches 18, 36, and 46 are carried out in the above described timing sequence, the above described disadvantageous phenomenon does not occur.

At the time of reproduction of the 2-channel of cartridge 100, a first (left) channel signal reproduced through the head 50a is supplied through the terminals 71a and 71b to the succeeding circuit (not shown), while a second (right) channel signal is supplied through the terminals 71c and 71d to the succeeding circuit. Furthermore, the lamp 72 is lit to indicate that a 2-channel cartridge is being reproduced, and, of the lamps 74a through 74d, that lamp corresponding to the program, among the first through fourth programs, being reproduced is lit.

When the reproduction of one program is completed, an electroconductive sensing tape (not shown) stuck to the recording tape comes into contact with the sensor 51 and electrically shorts the electrodes thereof, whereby the plunger 55 operates to drive the cam 54 through a rotational angle corresponding to one step thereof. As a result the head 50 is switched in height position and thus reproduces the succeeding recorded program.

Then, when the reproduction of the cartridge 100 is completed, and the cartridge is extracted from the guide plate 10, the lever 40 is caused by the force of the spring 42 to rotate in the clockwise direction, thereby ceasing to push the member 45. The button 47 of the switch 46 is thereby released and returned to its normal position, whereby the switch 46 is opened. At the same time, the bent part 43 of the lever 40 disengages from the cutout 26*a* of the slide bar 21, which is thereby unlocked.

On one hand, the lever 33 is rotated counterclockwise by the force of the spring 39, and its extension moves the button 37 of the switch 36 in the direction A, whereby the movable contacts of the switches 36-1 through 36-5 are switched from their respective contact points *a* to their contact points *b*.

Furthermore, together with the counterclockwise rotation of the lever 33, the slide plate 12 and the rod 15 move in the direction B, and the extreme end of the rod 15 ceases to push the pushing member 16. Then, since the member 16 is pivoted on the pivot pin 17 over a layer of silicone grease interposed therebetween, the button 19 of the switch 18 does not immediately return to its free extended position, as indicated by the single-dot chain line in FIG. 1, but returns with delayed action relative to the movement of the rod 15 in the direction B, thus closing the switch 18.

Thus, the extraction of the cartridge causes (1) the opening of the power-supply switch 46, (2) the switching of the movable contacts of all switches 36-1 through 36-5 of the switch 36 from their contact point *a* to their contact points *b*, and (3) the closing of the switch 18, in the sequence named.

If the above described opening and closing and changeover switching of the various switches were caused to occur substantially simultaneously, there would be instances of erroneous operations of the plunger 55 and the flip-flop circuit 75 due to remaining charges in the smoothing capacitors 85 and 89 even when the power-supply switch 46 is opened. In such a case, if the head is at a height position corresponding to the third or fourth programs at the time of extraction of the cartridge, there will occur a disadvantageous phenomenon wherein, at the time of cartridge extraction, the head height position switching will be carried out unnecessarily.

According to this invention, however, the switch 18 is not closed until the charge in the capacitor 85 has been naturally discharged by the load due to the amplifiers after the opening of the power-supply switch 46. Therefore, there is no possibility of occurrence of the above described disadvantageous at the time of extraction of the cartridge.

Figure 3:
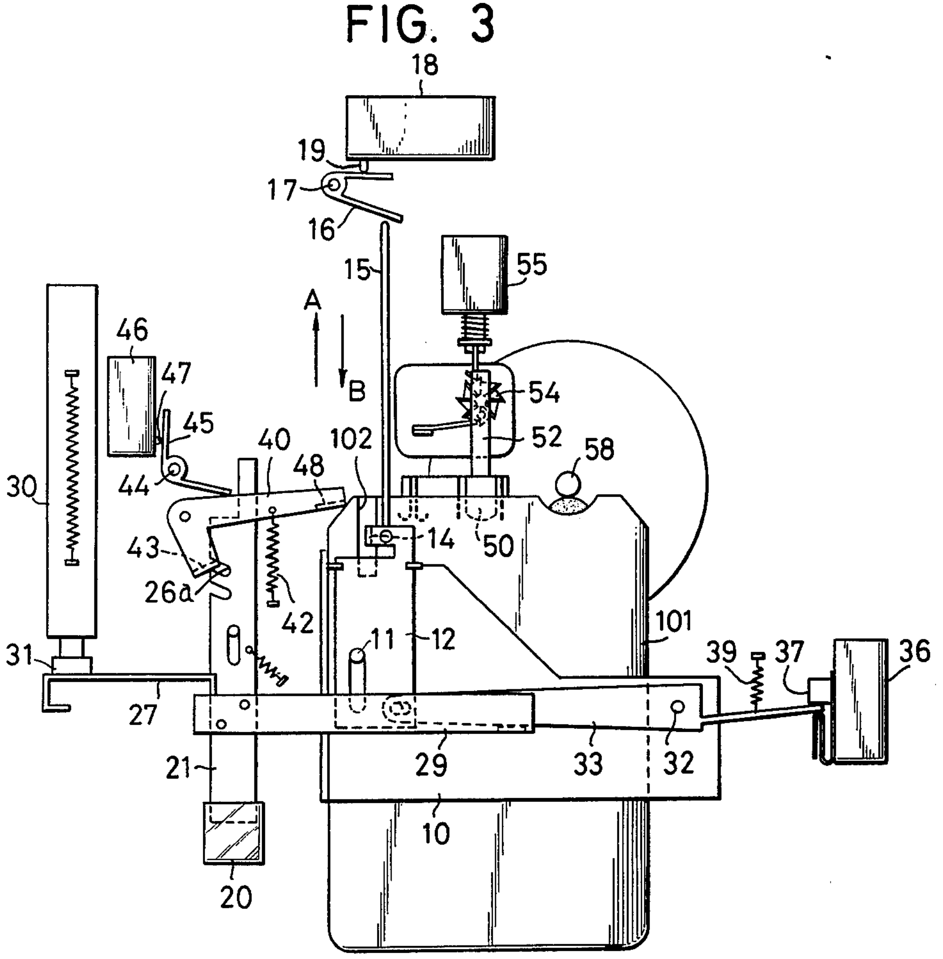
FIG. 3 is a similar plan view showing the same device in the operational state of reproducing a tape recording in a 4-channel cartridge.

Next, reproduction of a 4-channel cartridge will be described. As indicated in FIG. 3, a 4-channel cartridge 101 is inserted along the guide plate 10 in the direction A into the loaded position. The 4-channel cartridge 101 is provided with a slot 102 formed in its upper surface in a left forward position to confront the detecting part 14. Accordingly, when the cartridge is thus inserted into position, the detecting part 14 enters relatively into the slot 102 and, therefore, is not pushed by the cartridge 101 irrespective of the insertion of this cartridge into loaded position. Consequently, irrespective of the insertion of the cartridge 101 into loaded position, the switch 18 remains open, and the movable contacts of the switches 36-1 through 36-5 remain in contact with their respective contact points *b*.

On one hand, as the cartridge 101 is thus inserted, the lever 40 is pushed by the forward end of the cartridge and rotates counterclockwise thereby to close the power-supply switch 46. At the same time, this rotation of the lever 40 causes the bent part 43 to engage the cutout 26*a* thereby to lock the slide bar 21.

At the time of reproducing operation of this 4-channel cartridge 101, the signals of the first through fourth channels reproduced from the heads 50*a* through 50*d* are respectively supplied to terminals 71*a* and 71*d*. Furthermore, the lamp 73 is lit to indicate that a 4-channel cartridge is being reproduced.

On the other hand, the case where the head 50 is at a height position to confront the third or fourth program track on the tape at the time of insertion of the cartridge 101 will be considered. Since the flip-flop circuit 75 is closed circuited through the contact point 78*c* or 78*d* and the movable contact 77 at this time, the flip-flop circuit 75 is supplied with power and operates when the power-supply switch 46 is closed, and the coil 93 of the relay 92 is supplied with current during a predetermined time. Consequently, the relay switch 94 is closed during a predetermined time, whereby the solenoid coil 95 is closed circuited through the switches 18 and 94 and supplied with power, and the plunger 55 operates to rotate the cam 54.

When the cam 54 is thus rotated, and the load 50 is brought to a height position corresponding to the first program, that is when the rotatable contact 77 of the rotary switch 76 is brought into the state of contact with the contact point 78*a*, the flip-flop circuit 75 is no longer supplied with power and becomes inoperative.

Thus, even when the head 50 is at a height position corresponding to the third or fourth program track at the time of reproducing a 4-channel cartridge 101, it is always shifted to the height position corresponding to the first program track, and reproducing is thus carried out from the first program.

Figure 4:
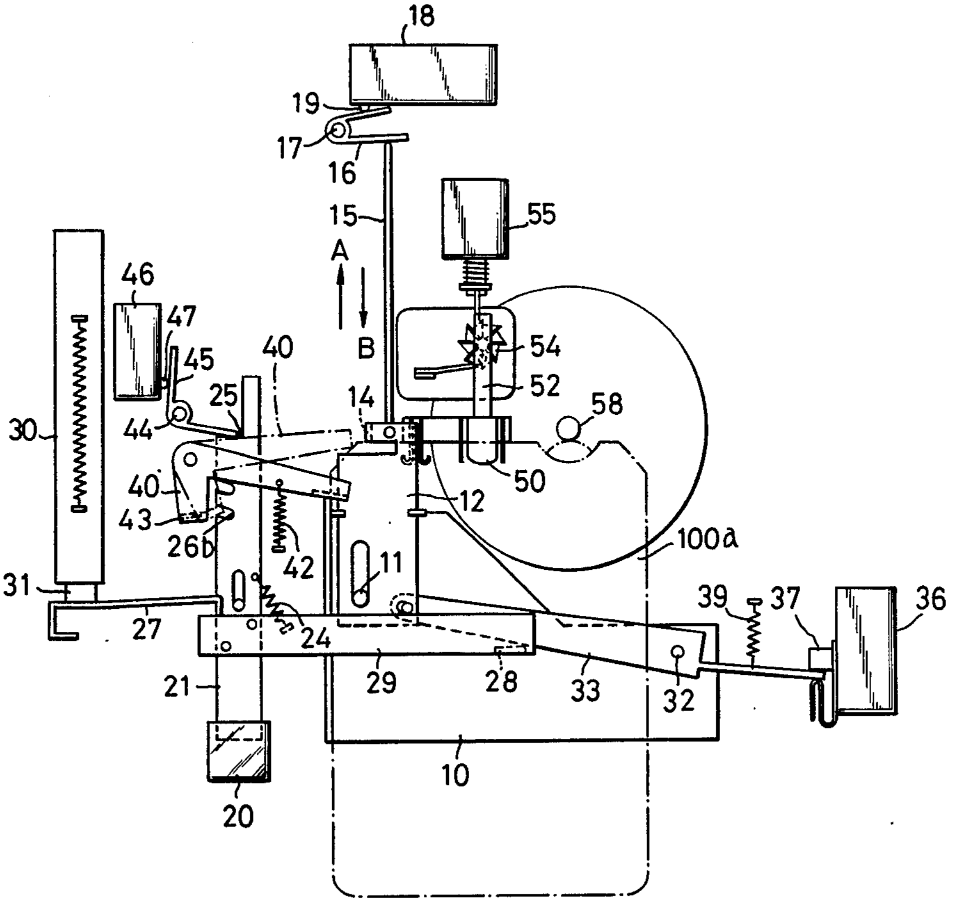
FIG. 4 is a similar plan view showing the same device in the operational states of recording level adjusting and recording of a 2-channel cartridge.

Next, the case of recording with a 2-channel cartridge will be described. In this case, as indicated in FIG. 4, the recording button 20 is first pushed inward thereby to cause the slide lever 21 to slide in the direction A against the force of the spring 24. Consequently the pushing member 27 and the arm 29 also move in the direction A unitarily with the slide lever 21, whereby the button 31 of the recording switch 30 is pushed, and the recording switch 30 changes the circuit connections with the heads 50*a* through 50*d* by way of the terminals 71*a* through 71*d* from the circuit on the reproducing side over to the circuit on the recording side.

Furthermore, as a result of the above mentioned movement of the arm 29, its pushing part 28 pushes the edge of the lever 33, which thereby rotates clockwise, whereby the slide plate 12 is moved in the direction A, and the rod 15 actuates the member 16 to open the switch 18. At the same time, this rotation of the lever 33 operates switch 36 to cause the movable contacts of its switches 36-1 through 36-5 to change from their contact points *b* over to their contact points *a*. Furthermore, as another result of the above mentioned movement of the slide lever 21, the stepped part 25 at its end actuates the member 45 to close the power-supply switch 46.

The sequence of opening and closing and changeover switching of the switches 18, 36, and 46 in this case is, as was described hereinbefore, with respect to the reproduction operation with a 2-channel cartridge.

The tape recorder in the above described state is prepared for the recording mode of operation, and, in this state, adjustment of the recording level can be carried out.

When a 2-channel cartridge 100*a* is to be recorded, the cartridge 100*a* as indicated in outline by a single-dot chain line in FIG. 4 is inserted along the guide plate 10 into loaded position as the recording button 20 is kept in its pushed-in state as described above. As the cartridge 100*a* is thus inserted, its front end pushes the lever 40, which is thereby rotated to the position indicated by single-dot chain line. As a result, the bent part 43 of the lever 40 engages with the cutout 26*b* in the slide bar 21 thereby to lock this slide bar. Accordingly, the slide bar 21 cannot return under the force of the spring 24 even when the recording push button 20 is released from hand pressure.

Upon completion of the recording of the cartridge 100*a*, the cartridge is extracted from the tape recorder, whereupon the lever 40 is returned by the force of the spring 42 to the position indicated by full line. Consequently, the slide bar 21 is released from its locked state due to the bent part 43, and the various related parts described above are returned by the forces of the springs 24 and 39 to their original states.

Further, this invention is not limited to these embodiments but variations and modifications may be made without departing from the scope and spirit of the invention.

What we claim is:

1. A 2-channel - 4-channel changeover device in a tape recorder having a loading part for insertion and loading thereinto a 2-channel cartridge accommodating therewithin a tape having a total of 8 tracks in groups each of four program tracks or, interchangeably, a 4-channel cartridge accommodating therewithin a tape having a total of 8 tracks in groups each of two program tracks, a magnetic head device having four head elements for abutting against four tracks on a tape, a mechanism for changing the height position of said magnetic head device in four steps in correspondence with first through fourth program tracks of said 2-channel cartridge, and a plunger for actuating said height-changing mechanism, said changeover device comprising:

- a normally-closed first switch connected to said plunger;
- a relay switch connected to said first switch;
- a relay-driving circuit for closing said relay switch during a short time required for one cycle of operation of said plunger;
- a second switch connected to said relay-driving circuit to carry out changeover switching;
- switching means for opening and closing said relay-driving circuit capable of closing said relay-driving circuit through said second switch when said magnetic head is in the height position corresponding to the third and fourth program track in accordance with the operation of said height changing mechanism;
- a third switch for connecting and disconnecting the power supply to the actuating device and to the relay-driving circuit;
- a rectifying circuit for rectifying AC power supplied through said third switch into direct-current power;
- a smoothing capacitor for smoothing the output direct-current voltage of said rectifying circuit and supplying the voltage thus smoothed to said plunger; and
- a switch operation changeover mechanism having a detecting part which is actuated by a 2-channel cartridge inserted into said loaded position, and which, when a 4-channel cartridge is inserted into the loaded position, enters into a slot formed in a specific position of said 4-channel cartridge;

said switch operation changeover mechanism operating, (1) when the 2-channel cartridge is inserted into a predetermined loaded position within the tape recorder, firstly to open said first switch, secondly to changeover said second switch in a manner to break the connection of said relay-driving circuit and said switching means for opening and closing the relay-driving circuit, and thirdly to close said third switch, (2) when the 2-channel cartridge is extracted from the tape recorder, firstly to open said third switch, secondly to changeover said second switch in a manner to connect the relay-driving circuit and the switching means for opening and closing the relay-driving circuit, and thirdly to close the first switch whereby the first switch is closed after a charge in said capacitor has been discharged to a degree which will not cause said plunger to operate after said third switch opens, and (3) when the 4-channel cartridge is inserted into the predetermined loaded position, to close the third switch, and not to open the first switch and not to changeover the second switch.

2. A 2-channel - 4-channel changeover device as claimed in claim 1 in which said switch operation changeover mechanism has a slide member actuated in sliding movement by a two-channel cartridge when said cartridge is inserted into the loaded position and an actuating member actuated by said slide member undergoing sliding movement to open said first switch, and said actuating member, upon being released from actuation by said slide member, operates with a time delay relative to the instant of release thereof to close the first switch.

3. A 2-channel - 4-channel changeover device as claimed in claim 2 in which said actuating member is pivoted on a pivot pin over a silicone grease interposed therebetween and thereby, upon being thus released from actuation by said slide member, does not immediately undergo instantaneous return rotation but undergoes return rotation at a low speed and thus closes the first switch with delayed action.

4. A 2-channel - 4-channel changeover device as claimed in claim 1 in which said switch operation changeover mechanism comprises a first switch operation changeover mechanism undergoing displacement in an intercoupled manner together with said detecting part thus actuated by a 2-channel cartridge being inserted into the loaded position and thereby operating firstly to open the first switch and secondly to change over the second switch and a second switch operation mechanism pushed by a 2-channel cartridge or a 4-channel cartridge being inserted into loaded position thereby to undergo displacement separately from said first mechanism thereby operating to close the third switch.

5. A 2-channel - 4-channel changeover device as claimed in claim 1 which further comprises a member for recording which is displaced at the time of recording operation and a fourth switch for recording which is changed over by the resulting displacement of said member for recording, and said member for recording is adapted to cause, in accompanying with its displacement, said switch operation changeover mechanism to operate in the same manner as at the time of insertion and loading and at the time of extraction of a 2-channel cartridge.

6. A 2-channel - 4-channel changeover device as claimed in claim 5 in which said switch operation changeover mechanism further has a lever actuated by a 2-channel cartridge or a 4-channel cartridge being inserted into loaded position to rotate and close the third switch, and said lever having a locking part for locking said member for recording in its position at the time of rotation of the lever.

* * * * *